US012452363B1

(12) United States Patent
Abburi et al.

(10) Patent No.: US 12,452,363 B1
(45) Date of Patent: Oct. 21, 2025

(54) SYSTEMS AND METHODS FOR INTELLIGENT CALL MANAGEMENT

(71) Applicant: UIPCO, LLC, San Antonio, TX (US)

(72) Inventors: Madhusudhana Rao Abburi, San Antonio, TX (US); Dwayne Phillip Wilson, Crossroads, TX (US); Brian Howard Katz, San Antonio, TX (US); Paul Joseph Astwood, San Antonio, TX (US); Christopher Russell, The Colony, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 115 days.

(21) Appl. No.: 18/459,528

(22) Filed: Sep. 1, 2023

Related U.S. Application Data

(60) Provisional application No. 63/374,277, filed on Sep. 1, 2022.

(51) Int. Cl.
*H04M 3/42* (2006.01)
(52) U.S. Cl.
CPC .............................. *H04M 3/42102* (2013.01)
(58) Field of Classification Search
CPC .......... H04M 3/436; H04M 3/54; H04M 3/42; H04M 3/42059; H04M 3/42042; H04M 3/42102; H04M 3/42068; H04M 2242/30
See application file for complete search history.

(56) References Cited

U.S. PATENT DOCUMENTS

| | | | | |
|---|---|---|---|---|
| 5,842,112 A * | 11/1998 | Fuller | .................... | H04M 11/00 340/8.1 |
| 6,169,904 B1 * | 1/2001 | Ayala | ................ | H04M 3/42229 455/445 |
| 6,999,763 B2 * | 2/2006 | Ramalho | ............... | H04W 88/06 455/526 |
| 8,238,538 B2 * | 8/2012 | Poder | .................... | H04M 3/436 379/212.01 |
| 10,325,599 B1 * | 6/2019 | Naidu | ................... | G06F 40/295 |
| 10,554,717 B2 * | 2/2020 | Torgersrud | .......... | H04L 65/1016 |
| 11,012,828 B2 * | 5/2021 | Rice | .................. | H04M 1/72484 |
| 2002/0004403 A1 * | 1/2002 | Yariv | ...................... | H04W 4/16 455/445 |
| 2003/0134648 A1 * | 7/2003 | Reed | ...................... | H04W 60/00 455/456.1 |
| 2003/0235173 A1 * | 12/2003 | Wood | ................ | H04M 3/42229 370/338 |

(Continued)

*Primary Examiner* — Akelaw Teshale
(74) *Attorney, Agent, or Firm* — Plumsea Law Group, LLC

(57) ABSTRACT

A system and method for routing incoming calls to one of many connected devices on a premises (including within a building) based on determining the location of an intended recipient of the call uses machine learning. Images and/or audio from connected devices can be analyzed with neural networks and/or natural language processing to identify an intended recipient in a particular area of the premises. In addition, the system and method include monitoring device activity to use as a proxy for the location of the intended recipient. Also, recent device activity can be used to determine where an intended recipient may be on the premises.

20 Claims, 12 Drawing Sheets

(56) References Cited

U.S. PATENT DOCUMENTS

| | | | |
|---|---|---|---|
| 2008/0004002 A1* | 1/2008 | Chin | H04W 4/02 |
| | | | 455/425 |
| 2008/0045234 A1* | 2/2008 | Reed | H04W 4/023 |
| | | | 455/456.1 |
| 2009/0175430 A1* | 7/2009 | Freeman | H04M 19/04 |
| | | | 379/207.16 |
| 2009/0180604 A1* | 7/2009 | Koch | H04M 3/54 |
| | | | 379/211.02 |
| 2009/0190742 A1* | 7/2009 | Freeman | H04M 3/436 |
| | | | 379/265.09 |
| 2015/0245184 A1* | 8/2015 | Govande | H04M 3/54 |
| | | | 455/417 |
| 2017/0026974 A1* | 1/2017 | Dey | H04M 3/42263 |
| 2018/0054406 A1* | 2/2018 | Albouyeh | H04W 4/023 |
| 2019/0347668 A1* | 11/2019 | Williams | G06F 18/2413 |
| 2020/0036544 A1* | 1/2020 | Suhail | G06Q 10/1093 |
| 2021/0344792 A1* | 11/2021 | Kats | H04M 1/576 |
| 2022/0210266 A1* | 6/2022 | Kats | H04M 3/42042 |
| 2022/0224794 A1* | 7/2022 | Auffret | H04M 3/42263 |

* cited by examiner

SYSTEMS AND METHODS FOR INTELLIGENT CALL MANAGEMENT

CROSS-REFERENCE TO RELATED APPLICATIONS

This application claims the benefit of Provisional Patent Application No. 63/374,277 filed Sep. 1, 2022, and titled "Systems and Methods for Intelligent Call Management," which is incorporated by reference herein in its entirety.

TECHNICAL FIELD

The present disclosure generally relates to systems and methods for managing incoming calls.

BACKGROUND

Using Voice over Internet Protocol (VOIP), or IP telephony (or similar packet-switching based telephony technologies) parties can make calls over the Internet (or another wide area networks) rather than over plain old telephone services (POTS-or similar legacy telephony technologies that leverage circuit-switching). Moreover, with an increased number of smart devices capable of handling VoIP calls in or on homes, offices, aircraft, maritime vessels, or other buildings/structures; it's possible for a user to receive a call at a smart device, such as a smart speaker, rather than on a cell phone, private branch exchange (PBX) extension, or conventional land line. Currently, incoming calls received at a device in a building (such as a home or office) may be broadcasted to multiple devices in the building to ensure the intended recipient can be reached. For example, in a home setting, when an incoming call arrives over a service running on a smart speaker, the smart speaker may broadcast the incoming call to multiple networked smart speakers (or other IoT devices) in the home, thereby increasing the likelihood that the intended recipient of the call will pick up the call from a nearby VoIP capable device. However, broadcasting incoming calls to all connected devices in a home can be intrusive, and can interfere with the ongoing operations of devices that serve multiple purposes beyond simply providing a VoIP interface. That is, current systems lack the ability to dynamically route incoming VoIP calls to a single connected device (or targeted subset of connected devices) within a home, vessel, structure, or business, based on where the intended recipient of the call is located (or likely to be located) within or in relative proximity to such premises.

There is a need in the art for a system and method that addresses the shortcomings discussed above.

SUMMARY

In some aspects, the techniques described herein relate to a method, including: receiving, at a call routing system running on a computing device, an incoming call; determining, at the call routing system, an intended recipient for the incoming call; receiving first sensed information from a first device located in a first area of a building and receiving second sensed information from a second device located in a second area of a building, wherein the first area and the second area are different; using machine learning to identify the intended recipient from either the first sensed information or the second sensed information; selectively routing the incoming call to a first calling device in the first area when the intended recipient is identified using the first sensed information, and selectively routing the call to a second calling device in the second area when the intended recipient is identified using the second sensed information.

In some aspects, the techniques described herein relate to a method, including: receiving, at a call routing system running on a computing device, an incoming call; determining, at the call routing system, an intended recipient for the incoming call; retrieving a list of user devices associated with the intended recipient; querying a first device located in a first area and a second device located in a second area to check for any devices from the list of user devices that are in communication with the first device or with the second device; receiving, in response to querying the first device and the second device, information about one or more user devices in the list of user devices; determining that at least one user device in the list of user devices is located near the first device or near the second device; and upon determining that the at least one user device is located in the first area or the second area, the method further includes selectively routing the call to a first calling device in the first area when the at least one user device is determined to be near the first device, and selectively routing the call to a second calling device in the second area when the at least one user device is determined to be near the second device.

In some aspects, the techniques described herein relate to a method, including: receiving, at a call routing system running on a computing device, an incoming call; determining, at the call routing system, an intended recipient for the incoming call; querying a first device located in a first area and a second device located in a second area to check for recent user activity on the first device and on the second device, wherein the recent user activity is associated with the intended recipient; receiving information about recent user activity from the first device and from the second device; determining that the intended recipient is located in the first area or the second area based on the recent user activity on the first device and on the second device; and upon determining that the intended recipient is located in the first area or the second area the method further includes selectively routing the call to a first calling device in the first area when the intended recipient is determined to be (or likely to be) in the first area and selectively routing the call to a second calling device in the second area when the intended recipient is determined to be in the second area.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
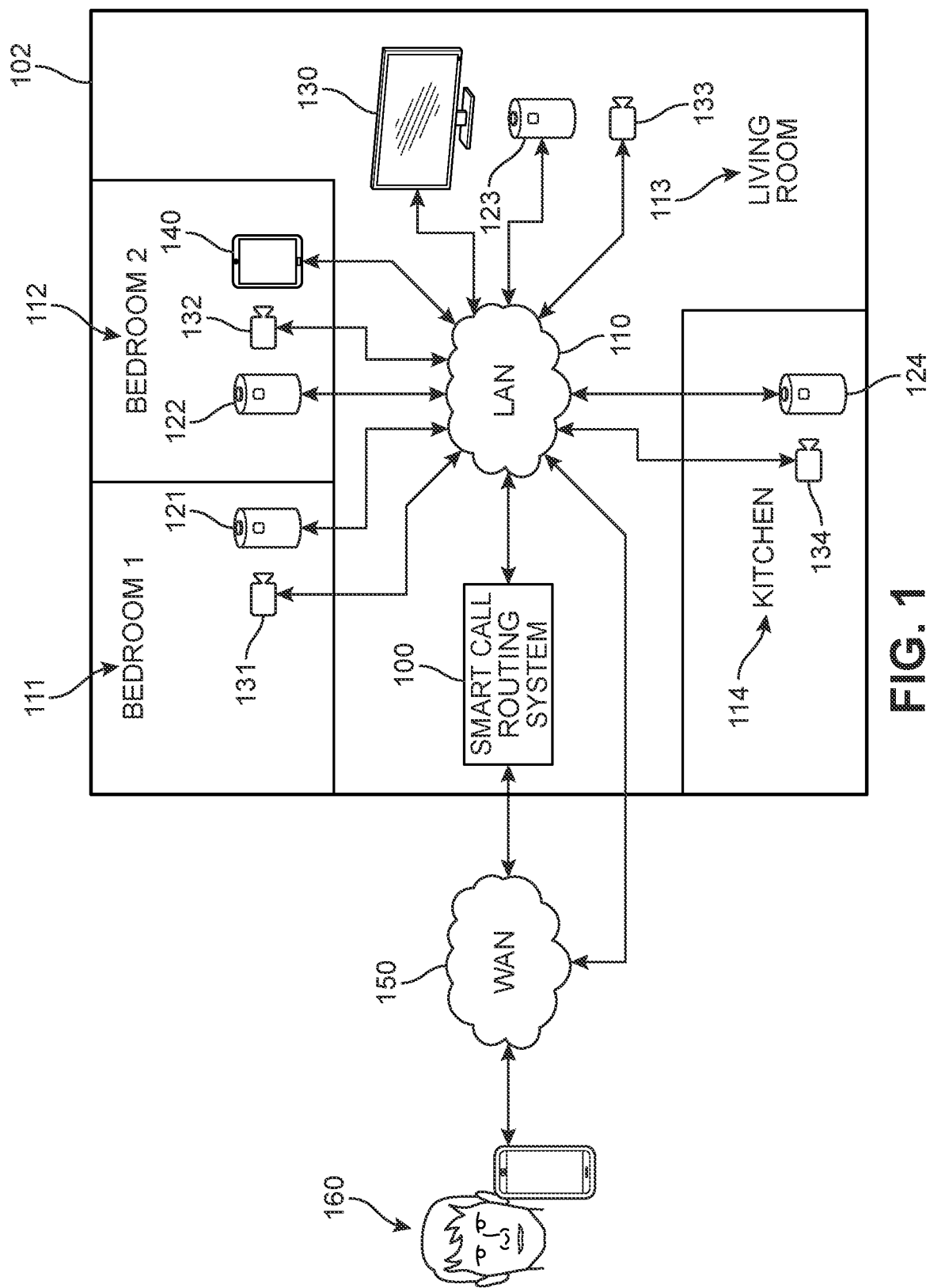
FIG. 1 is a schematic view of a configuration of connected devices within a building, according to an embodiment.

The embodiments provide systems and methods for selectively routing incoming calls in a building to a connected device that is accessible to an intended recipient of the incoming call. The systems and methods allow: (1) determining an intended recipient for an incoming call based on information about the incoming call; (2) identifying the intended recipient within the building using information from one or more connected devices in the building; (3) locating the intended recipient within the building; and (4) routing the incoming call to a connected calling device that is located in the same area (e.g., room) as the intended recipient.

The exemplary systems and methods overcome technical problems related to receiving VoIP or similar calls over networks in buildings with many connected devices. Current systems cannot route incoming calls to a single device, since they lack information about (1) who the intended recipient of the call is, and (2) where the intended recipient is located within a building, or if they are even there. Exemplary systems solve this problem by providing methods and systems to determine an intended recipient from information associated with an incoming call, and then automatically identify and locate the intended recipient within the building, using machine learning, so that the call can be routed to the nearest connected device.

Various terms used throughout the detailed description and in the claims are defined here for clarity.

As used herein, the term "call" refers to any communication over audio and/or audio-video channels. Calls can include voice calls and/or video calls. The term "incoming call" is further used to refer a call that has yet to be answered by a recipient at a device. As discussed, an incoming call could be received at one device, and then routed to one or more other devices in a building.

The term "building," as used herein, refers to any structure for housing or working. Buildings can include homes, offices, warehouses, aircraft, spacecraft, maritime vessels, natural or created structures, or any other suitable buildings. A building may be further comprised of different areas, including rooms. In buildings with multiple different connected devices disposed in different areas, it may be necessary to route calls to specific connected devices according to the area (e.g., room) where an intended recipient of the incoming call is located. In some cases, calls may be routed throughout multiple buildings, or through large geographic areas including areas that may not be sheltered. The term "premises" refers to any buildings or structures and their associated land and outbuildings.

The term "connected device" may refer to any device capable of communicating with other devices over a network or through ad-hoc point-to-point connection. Examples of connected devices include so-called "smart devices", Internet of Things (IoT) devices, and other devices. In the context of calls, a "calling device" is any connected device that can make and/or receive calls. Thus, a calling device may have at least a microphone and a speaker. Exemplary calling devices could include phones, smart speakers, tablets, laptops, desktop computers, wearable devices (such as smart watches, smart glasses, smart rings, smart clothing and/or implantable devices), embedded devices, and other suitable devices. For video calls, a calling device may further include a camera. Exemplary video calling devices include phones, tablets, laptops, desktop computers, smart glasses, smart rings, smart clothing, implantable devices, embedded devices, and designated video calling devices.

The term "artificial intelligence" refers broadly to a variety of different technologies for using computing devices to perform intelligent analysis and make intelligent decisions. Artificial intelligence can include, but is not limited to, systems that enable smart routing systems who can receive information, process the information and act on that information in an intelligent manner. In addition, the term "machine learning" is used to describe any algorithms, models, or suitable software code for systems that can learn from data and make appropriate predictions. Exemplary machine learning systems include, but are not limited to: neural networks and natural language processing (NLP), and image classifier systems.

The terms "user services" and "user activity" may be used. User services are services provided via connected devices. For example, smart speakers can provide user services such as audio streaming services, weather services, calendar services, as well as other suitable services. User activity refers to specific activity for a given user service. For example, a user could request that a smart speaker play a song (the user activity) from a streaming service (the user service). The user service and/or user activity may be associated directly to a specific user, based on authentication information used to sign-in to the service, based on patterns of activity, or based on other suitable information. The user activity may also be passive in nature-such as where a device recognizes audible or visual data, gyroscopic movements, GPS data (including differential GPS functions for microlocation), temperature and temperature shifts (e.g., as indications of transitional movements within a building (e.g. rooms changes) or entry/exit from a building whether alone or in concert with historical and environmental data), olfactory or chemical species detection, accelerometry (e.g., patterns associated with walking, driving, flying, stasis), device alarm deactivation, button or switch contact, or impedance/capacitance or other electromagnetic, pressure, optical, concussive or other device detections associated with active use or handling. Thus, as described in further detail below, user services and user activity may be analyzed to determine if a particular user (such as the intended recipient of a call) has recently interacted with a particular connected device providing a user service.

FIG. 1 is a schematic view of one exemplary scenario where a smart call routing system 100 ("routing system 100") could be used to route incoming calls to one of several different connected devices within a building 102. In this example, building 102 is shown as having the layout of a small house or apartment. Specifically, building 102 includes distinct rooms, including a first room 111 ("Bedroom 1"), a second room 112 ("Bedroom 2"), a third room 113 ("Living Room"), and a fourth room 114 ("Kitchen"). However, it may be appreciated that similar provisions could be used with any other kinds of homes, office spaces, or other buildings that include multiple connected devices disposed in any number of rooms or spaces. Moreover, in other embodiments, a single room may be further divided into distinct "areas", where each area is associated with different connected devices. For example, in very large rooms a single room could have multiple areas, each with a separate smart speaker that can be used for calling, as well as other activities.

As seen in FIG. 1, smart call routing system 100 comprises a device that is connected to a local area network (LAN) 110. In some cases, LAN 110 could be a wired LAN, for example, ethernet. In other cases, LAN 110 could be a wireless network, for example, utilizing Wi-Fi, Bluetooth (point to point or mesh), or other proprietary or open system IoT device communication protocols. Within building 102, various other connected devices are also connected to LAN 110. These include, for example, a first smart speaker 121, a second smart speaker 122, a third smart speaker 123, and a fourth smart speaker 124. As used herein, a smart speaker may be any device that can interface with a user through voice commands. Smart speakers may include at least a microphone and a speaker. Smart speakers can also facilitate various user services, such as streaming music services, calendar services, weather services, and various other services. Likewise, building 102 includes a first video recording device 131, a second video recording device 132, a third video recording device 133, and a fourth video recording device 134. Examples of connected video recording devices include, but are not limited to: security cameras, cameras for enabling video chats, and other suitable connected devices that can record video.

In the exemplary embodiment, each room of building 102 includes at least a smart speaker and a connected video recording device. Some rooms may also include other smart devices. For example, third room 113 includes a smart television 130. Smart television 130 can provide various user services such as streaming video, streaming music, streaming video games, or other suitable services.

In some embodiments, information from one or more security systems associated with a building or structure could be leveraged to help identify and locater users. For example, datasets from security systems could be used. These datasets could include information related to biometric information, retinal scans, thumbprints, security codes, keycards, FOB, RFID, and/or voice passport systems that may be used by a person for access to different areas of the building (or areas of a premises). For example, when attempting to identify and locate a user within a building, a system could query a security system to determine that the user recently scanned his or her thumbprint to enter a secure area of the building. This would allow the system to infer that the user is currently (or was recently) located in that secured area.

In some embodiments, mobile devices can also be in communication with other devices via LAN 110 or any other suitable network. For example, in FIG. 1 a mobile device 140 (shown as a tablet computer) communicates using LAN 110. Mobile devices, such as mobile device 140, may also communicate directly with other connected devices over different networks such as personal area networks (PANs) like Bluetooth. As discussed in further detail below, gathering information about a device that is known to belong to (or be frequently used by) a particular user could allow a smart call routing system to infer the location of that user. In addition, in some cases, incoming calls could be dispatched to one or more devices that may be associated to specific users.

In FIG. 1, a caller 160 places a call over a wide area network (WAN) 150. The call can be placed using VoIP or some other suitable digital calling technology. The incoming call is received by routing system 100 (either directly, or via LAN 110 which may be directly connected to WAN 150). Using conventional systems, any incoming calls would be broadcast to multiple connected devices capable of handling calls simultaneously, to ensure that the call can be picked up someone in the building. Using the exemplary systems and methods, however, the smart call routing system can automatically determine the intended recipient of the call, and then identify and locate the intended recipient within the building. With the location of the recipient known, the smart call routing system can route the incoming call to the nearest connected device capable of handling calls (that is, a "calling device") or to a device in the same room as the intended recipient (which may or may not be the nearest connected device in some situations).

Figure 2:
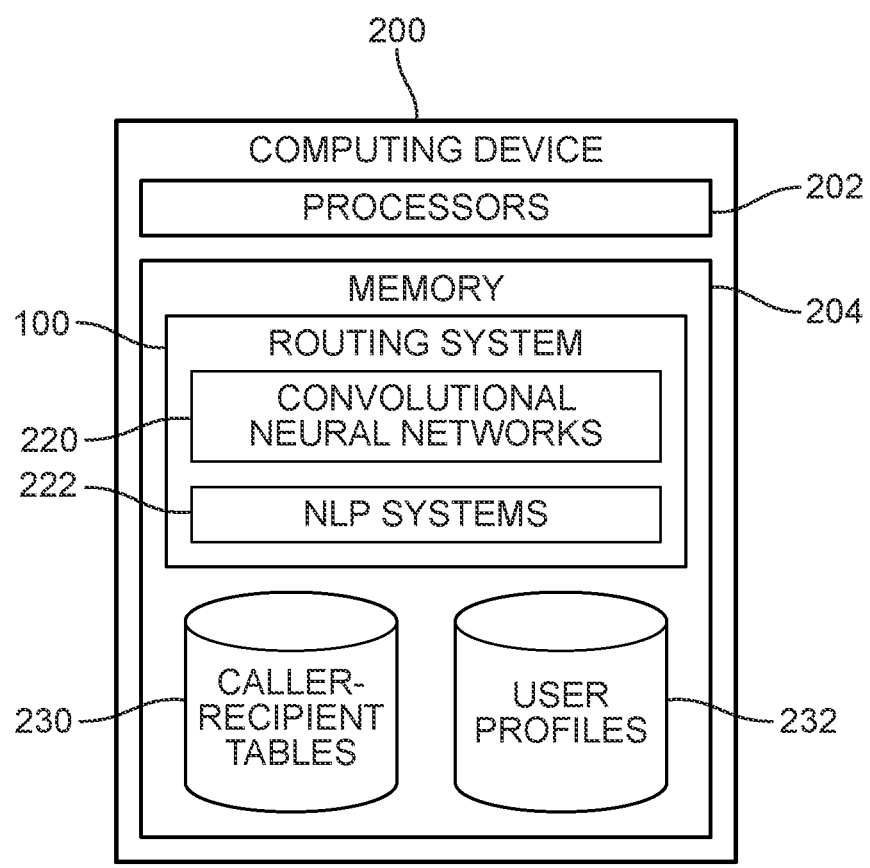
FIG. 2 is a schematic view of a computing device, according to an embodiment.

FIG. 2 is a schematic view of a computing device 200 that can run software associated with routing system 100. As seen in FIG. 2, computing device 200 may include one or more processors 202 and memory 204. Memory 204 can comprise a non-transitory computer-readable medium storing instructions that are executable by processors 202 to perform various methods.

Memory 204 may store instructions that are executable to run smart routing system 100. Moreover, routing system 100 can include modules or software components that enable various capabilities, including some described in detail below. These can include convolutional neural networks 220 for identifying recipients from images, as well as natural language processing (NLP) systems 222 for identifying recipients from audio samples. Embodiments need not be limited to any particular kinds of machine learning systems, including neural networks. In other embodiments, any suitable neural networks for identifying recipients could be used including any deep neural networks, transformer-based neural networks, graph neural networks, and capsule neural networks.

Computing device 200 could also store, locally, or via a remote connection to other devices, caller-recipient tables 230 and user profiles 232. Caller-recipient tables 230 comprise data that associates known callers with common recipients, where the recipients are users who may live, work, or otherwise be in a building. User profiles 232 can include information about users in a building, who may be the recipients of calls. In some cases, this information can be used to identify and/or locate users. User profiles 232 can store information including, but not limited to: identifying images, identifying audio samples, user-specific device information, user-specific activity information (for example, streaming activity), as well as other suitable user information.

In the exemplary architecture of FIGS. 1-2, computing device 200 may be a dedicated device to manage incoming calls. In other cases, however, computing device 200 could be any other suitable device, such as a smart speaker or other smart device. Moreover, in embodiments where computing device 200 includes provisions for enabling voice calls, computing device 200 could be capable of routing an incoming call to itself, when the intended recipient is in the same room as the computing device 200, or else sufficiently close to computing device 200.

Figure 3:
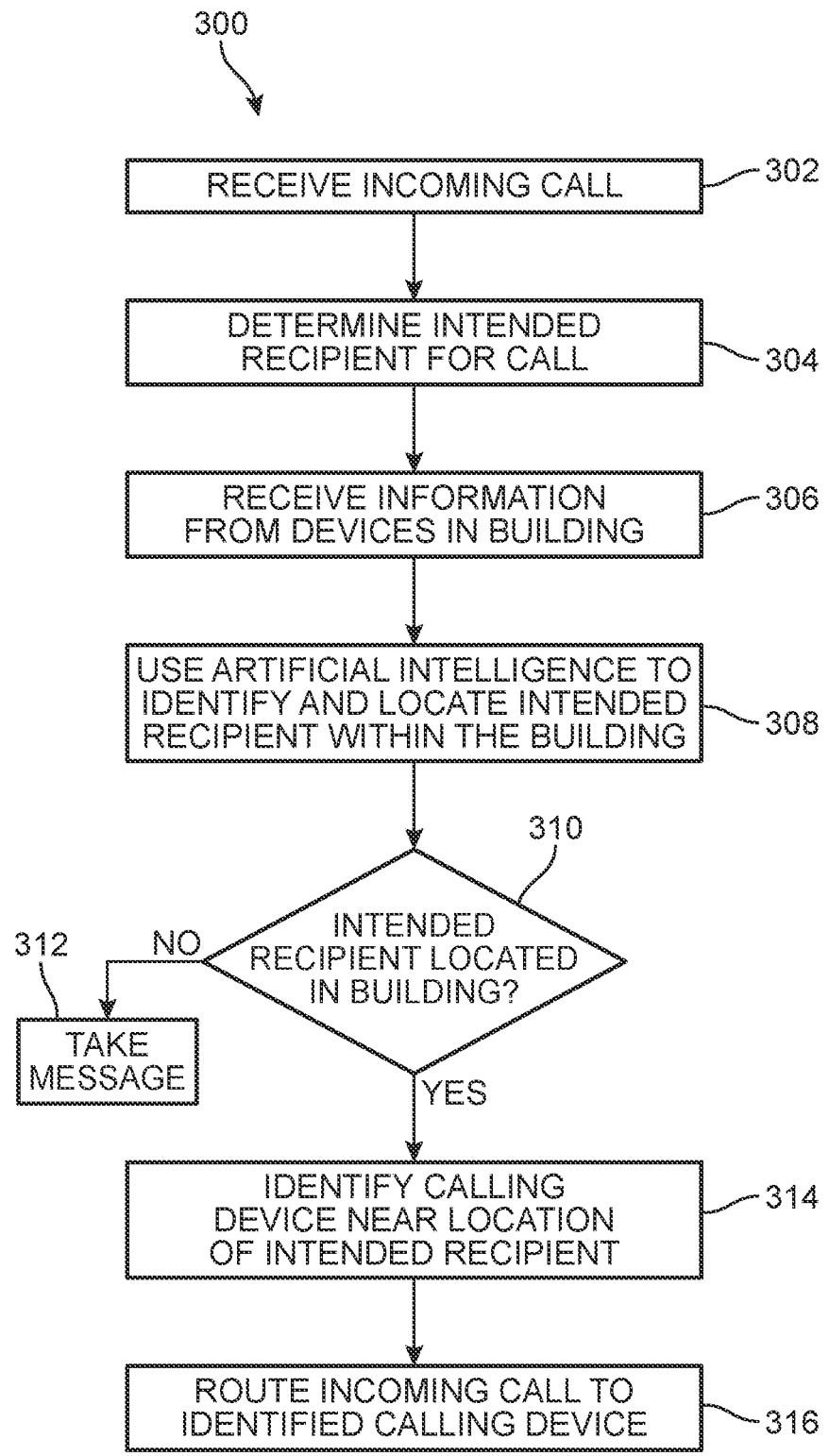
FIG. 3 is a schematic view of a process for routing calls to a device near an intended recipient, according to an embodiment.

FIG. 3 is a schematic view of a process 300 for routing an incoming call to a selected calling device within a building (or, more broadly, to a calling device on a premises). It may be appreciated that one or more of the following steps may be performed by a smart call routing system. Starting at step 302, a smart call routing system may receive an incoming call. In step 304, the smart call routing system may determine an intended recipient for the call using various methods discussed in further detail below. Next, in step 306, the smart call routing system may receive information from one or more devices in the building (or premises). For example, the smart call routing system could receive images from one or more connected video devices. Also, the smart call routing system could receive audio clips from one or more smart speakers, or other smart devices with microphones. Other kinds of information received in step 306 could include information about user-specific devices that are near one or more connected devices, GPS information for various devices, and user activity information for user services running on one or more connected devices in the building (or premises).

Next, in step 308, the smart call routing system may use artificial intelligence to identify and locate the intended recipient within the building (or otherwise on the premises). In step 310, the smart call routing system determines if the recipient is located within the building (or on the premises) and/or if the intended recipient is known to be otherwise unavailable. If the intended recipient is not located in the building (or on the premises), the smart call routing system proceeds to step 312. In step 312, the smart call routing system can prompt the caller to leave a message.

If the smart call routing system determines that the intended recipient of the call is in the building (or on the premises), the smart call routing system proceeds to step 314. At this point, the smart call routing system attempts to find a calling device that is located near the intended recipient. For example, the system may locate a calling device, such as a smart speaker, that is located in the same room where the intended recipient is located. Once the closest calling device is found, the system proceeds to step 316 to route the incoming call to the identified calling device.

Figure 4:
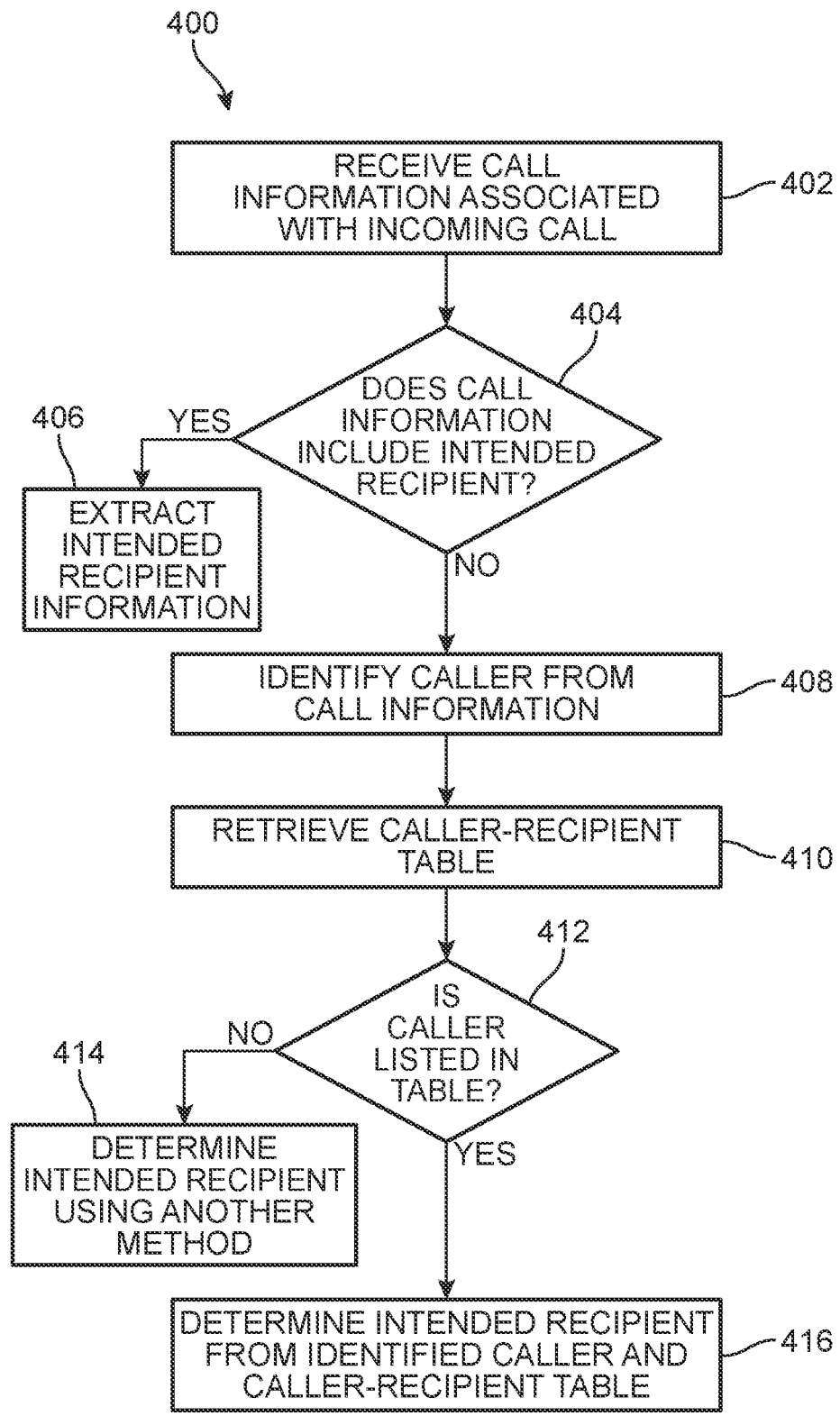
FIG. 4 is a schematic view of a process for determining an intended recipient of an incoming call, according to an embodiment.

FIG. 4 is a schematic view of a process 400 for determining an intended recipient for a call, according to an embodiment. Specifically, the smart call routing system may be configured to determine who the caller is intending to speak with.

Starting in step 402, once an incoming call has been received, a smart call routing system can receive call information associated with the incoming call. As used herein, the term "call information" refers to any kind of meta-data that may be associated with a call. Call information for the caller ("caller information") can include, in some cases, a phone number, automatic number identifier (ANI) or Caller Name (CNAM) or similar Caller ID components, IP address, MAC address, security certificates, name, physical address, username, device serial number, device model, call supervisory information (for example SS7 payloads if originating or terminating upon a public switched telephone network node) or other identifying information for a caller. Call information can also include, in some cases, a phone number, IP address, name, physical address, username, or other identifying information for an intended recipient of the call. Call information for the recipient ("recipient information") can be provided in any format and can be transmitted simultaneously with voice information for a call, or separately from any voice information.

In step 404, the smart call routing system determines if the call information includes information about the intended recipient of the call. If so, the smart call routing system proceeds to step 406. At this point, the smart call routing system can extract any intended recipient information, such as a name, phone number, IP address, physical address, username, or any other identifying information.

When, in step 404, there is no intended recipient information, the smart call routing system proceeds to step 408. In step 408, the smart call routing system can first identify the caller from any received caller information. This may be feasible as caller information is often sent as part of a call, even when intended recipient information is not sent. For example, current cell phones often receive, as part of a cellular call, information identifying the phone number and/or name of the calling party.

In step 410, the smart call routing system may retrieve a caller-recipient table. The caller-recipient table may comprise a list of possible recipients for each given caller. In one embodiment, a caller-recipient table could be built from contact lists for different users in a building. In such cases, it may be possible to identify the intended recipient of the call based on the identity of the caller. In cases where multiple recipients may be associated to a single caller, the caller-recipient table may identify the most likely recipient. For example, for a caller who has historically called two different recipients in the house, the table may list only the recipient who is called most often.

Once the caller-recipient table is retrieved, the smart call routing system can proceed to step 412 to determine if the caller for the incoming call is listed in the retrieved table. If so, the smart call routing system proceeds to step 416 to determine the intended recipient using the table. Otherwise, if the caller is not listed in the table, the smart call routing system proceeds to step 414 to determine the intended recipient using another method.

Figure 5:
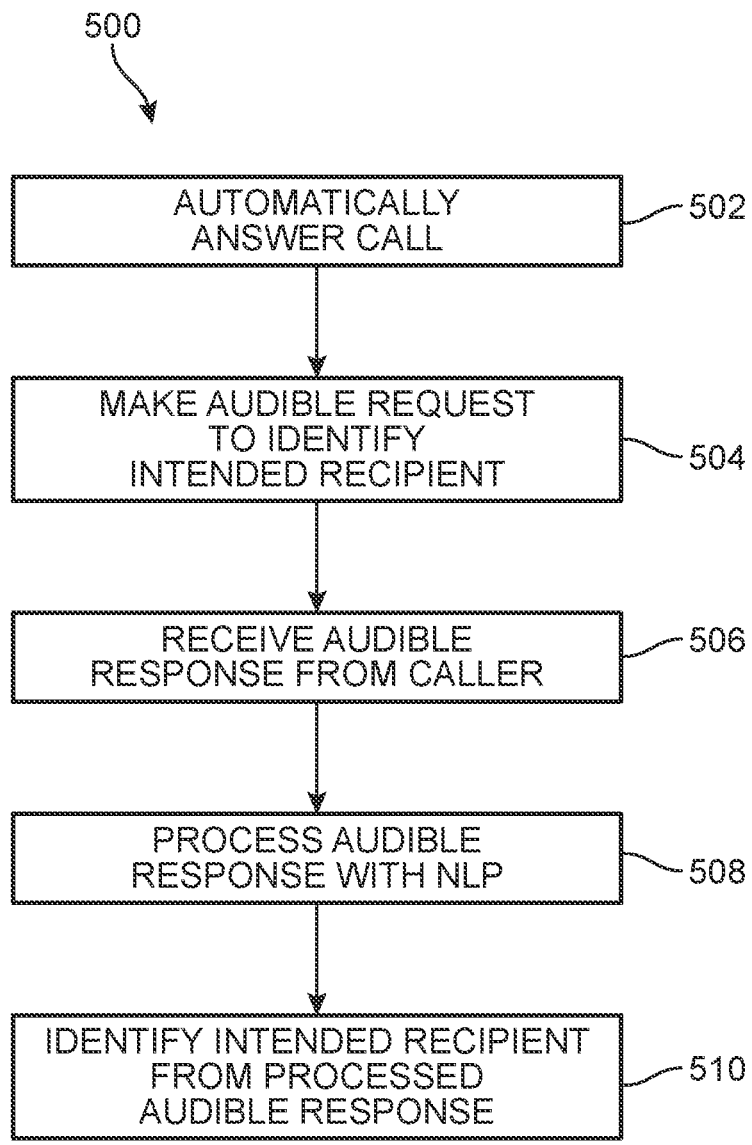
FIG. 5 is a schematic view of a process for determining an intended recipient of an incoming call, according to an embodiment.

In situations where caller and/or intended recipient information is not transmitted as part of a call, a smart call routing system can automatically answer a call to determine the intended recipient of the call, as in process 500 of FIG. 5. Referring to FIG. 5, the smart call routing system can answer the incoming call automatically in step 502. Next, in step 504, the smart call routing system can make an audible request to have the caller identify the intended recipient. This request could be prerecorded or could comprise synthesized speech. In step 506, the smart call routing system receives an audible response from the caller. The response is then processed using natural language processing in step 508, for example, using a speech-to-text system. This allows the system to identify the intended recipient in step 510. Alternatively, rather than directly converse with the caller to determine an intended recipient, a system could simply analyze audio from the caller and identify the caller based on known audio signatures that may be stored in a local database. Then, the intended recipient could be inferred using a caller-recipient table.

After the identity of the intended recipient is determined, the smart call routing system proceeds to track down the intended recipient within the building so that the incoming call can be routed to a device near the intended recipient without having to broadcast the call to multiple devices in the building simultaneously.

Figure 6:
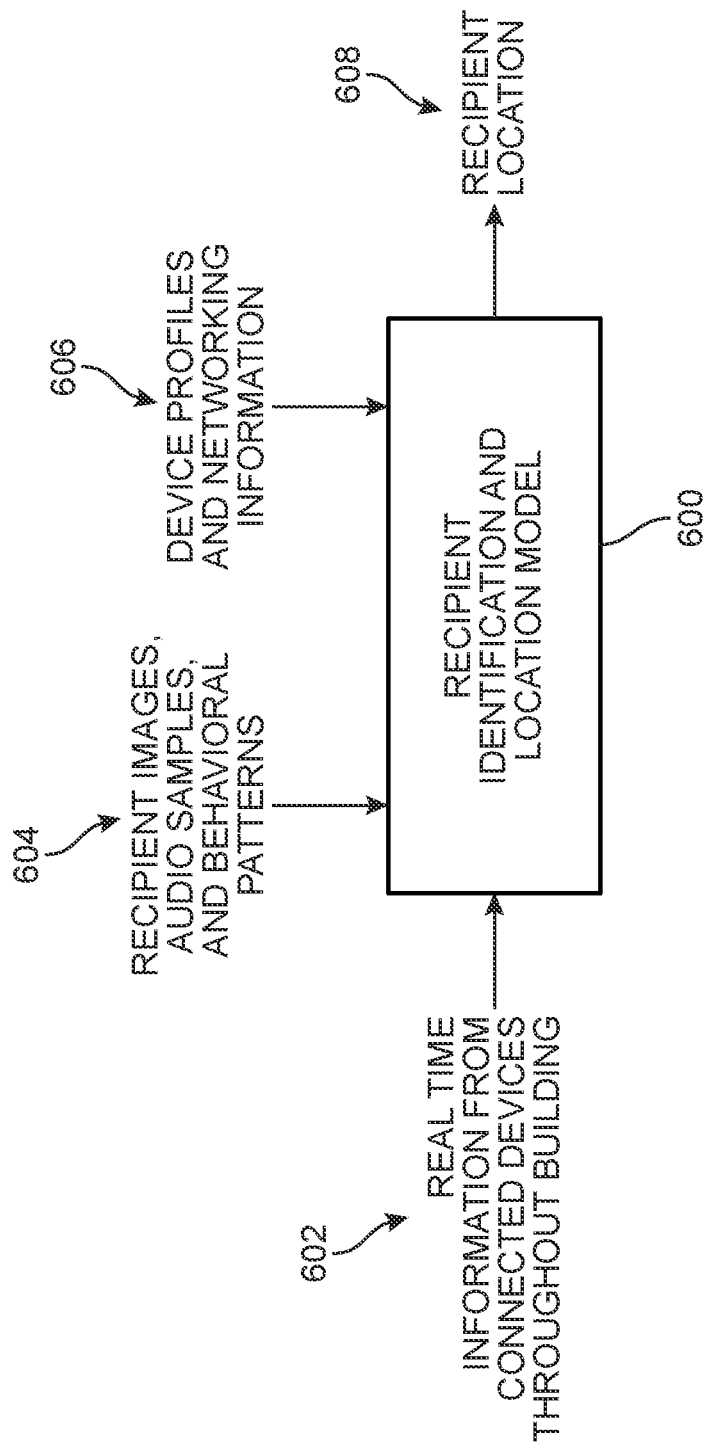
FIG. 6 is a schematic view of a process for identifying and locating an intended recipient for an incoming call, according to an embodiment.

FIG. 6 is a schematic view of high-level inputs and outputs to a recipient identification and location model 600 ("model 600"), which may be used to identify an intended recipient in a building and determine the recipient's location. In this embodiment, model 600 receives real-time information from connected devices throughout the building (inputs 602). This information can include, for example, images from cameras, audio from microphones, security access devices, user device activity, as well as other suitable information gathered by one or more connected devices.

Model 600 may also receive other kinds of information, which may be used in constructing or tuning the model. For example, model 600 may include one or more machine learning models that are trained using recipient images, audio samples, and/or user behavioral patterns (inputs 604). Using machine learning models trained on this data, model 600 may be configured to identify a known user (the intended recipient of a call) from images and/or voice data.

Additionally, model 600 could utilize device profiles and networking information (inputs 606). Specifically, for example, model 600 can store information about user devices, such as identifying information for the devices and historical networking patterns for the devices, to help identify devices belonging to known users and locate those devices within a building.

Model 600 may output a recipient location (output 608). The recipient location identifies a location within a building, such as a room, or other predefined area, where the intended recipient is presumed to be at the time the incoming call is received. In cases where model 600 is unable to identify the intended recipient from the real-time information received from one or more connected devices, the recipient location may be returned as null. When the recipient location is returned as null, the smart call routing system assumes the intended recipient is not in the building and takes a message rather than trying to route the call, as in step 312 of FIG. 3. In some cases, prior to returning a null location for the recipient, information from any egress sensors may be used to confirm if a user is or is not on premises.

Figure 7:
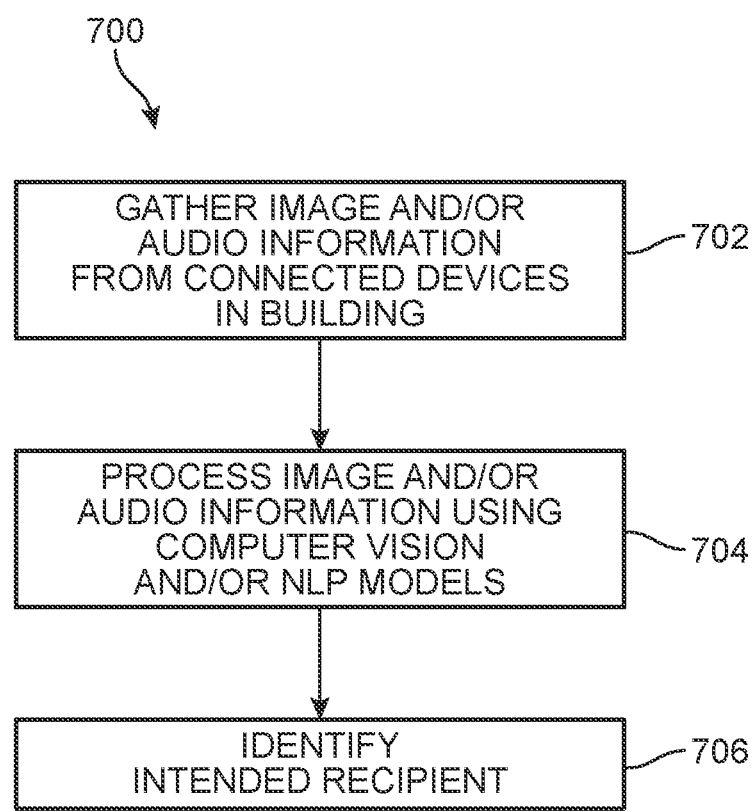
FIG. 7 is a schematic view of a process of identifying an intended recipient using machine learning applied to images and/or audio from connected devices in a building, according to an embodiment.

FIG. 7 shows a process 700 for identifying an intended recipient. Specifically, process 700 may be used to identify an intended recipient based on data from one or more connected devices in the building. Thus, whereas the processes discussed above (for example, process 400 in FIG. 4) is used to extract the name (or other identifying information) of the intended recipient based on incoming call information, process 700 may be used to identify the intended recipient within the building, once the name of the recipient is known.

In step 702, the smart call routing system can gather real-time image and/or audio information from one or more connected devices within a building. These could include, for example, connected cameras, smart speakers, security devices, or other devices that are capable of monitoring or capturing video and/or audio. Next, in step 704, the images and/or audio may be processed using suitable machine learning models. These could include, for example, computer vision models for images and NLP models for audio information. In one embodiment, images may be processed using a neural network (e.g., convolutional neural network) that has been pre-trained with images of various users within a building. In one embodiment, audio may be processed using a voice recognition model that has been pretrained with audio samples from various users in a building. Based on processing video and/or audio information, the system can identify the intended recipient, as in step 706. In other embodiments, a system could be equipped with chemical sensors that can detect olfactory signatures. Known olfactory signatures could be compared to data detected from one or more chemical sensors. Such analysis could be used to infer not only the presence of the intended recipient in a particular area, but also the timing since the recipient's departure (based on strength of the chemical signature, for example).

In some situations, the location of the intended recipient is determined simultaneously with the identification process, since the data used to identify the intended recipient has been extracted from a known device with a particular known location within a building. Thus, in some cases, the process of identifying an intended recipient is done by analyzing images, audio, or other information from multiple data streams, where each data stream is associated with a distinct device/location.

Figure 8:
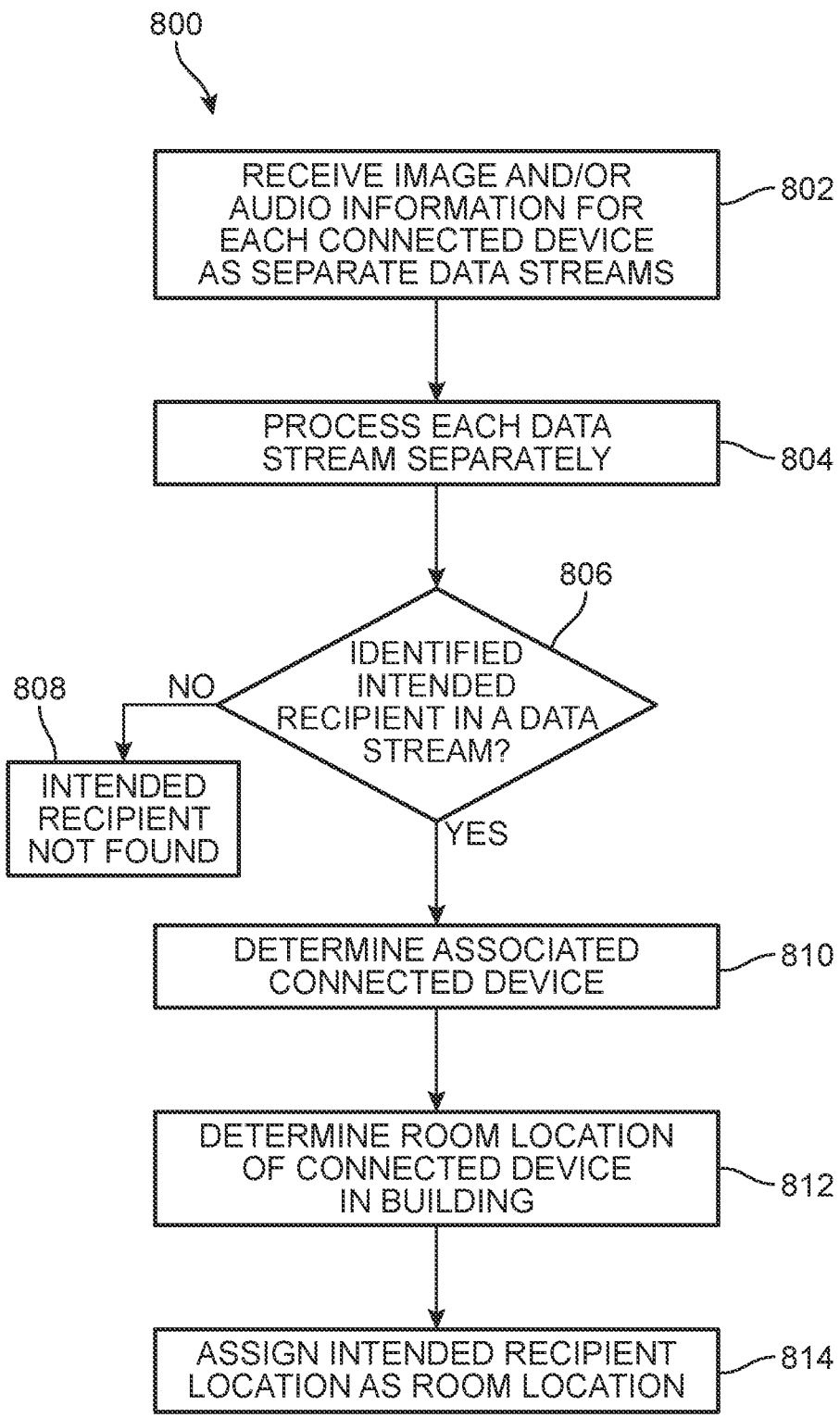
FIG. 8 is a schematic view of a process for determining a location of an intended recipient within a building, according to an embodiment.

An exemplary process of analyzing different data streams corresponding to different devices/locations simultaneously is shown as process 800 in FIG. 8. Starting in step 802, the smart call routing system receives image and/or audio information (such as a set of images and/or an audio clip) from each connected device and organizes the information into different data streams for the purpose of analysis. Next, in step 804, the smart call routing system processes each data stream separately, by applying image recognition and/or voice recognition to each data stream. Thus, for a simple configuration with only two connected devices in a building, the system could analyze a first set of images from a first device and a second set of images from a second device. Likewise, the system could analyze a first audio sample from the first device and a second audio sample from the second device.

In step 806, the smart call routing system determines if the intended recipient has been identified in any of the data streams. If not, in step 808, the smart call routing system determines that the intended recipient has not been found.

If the intended recipient has been found in one of the data streams, the smart call routing system proceeds to step 810. In step 810, the routing system determines the connected device that produced the associated data stream. For example, the routing system could determine that the intended recipient was identified in images received from a connected camera in a house. Next, in step 812, the routing system determines a room (or other predetermined location/area) for the connected device within the building. For example, the routing system could retrieve stored information for a particular connected camera to determine that the camera is located in the living room of a house. In step 814, the routing system then sets the intended recipient location according to the location of the connected device. Thus, if the intended recipient was identified in images received from a connected camera in a living room of a house, the recipient location is determined to the living room, for the purposes of routing an incoming call.

Not all buildings may have connected cameras and/or microphones for obtaining real-time video and/or audio data to identify an intended caller. In some cases, therefore, the smart call routing system can leverage information about devices that may be commonly used (and/or owned) by the intended recipient.

Figure 9:
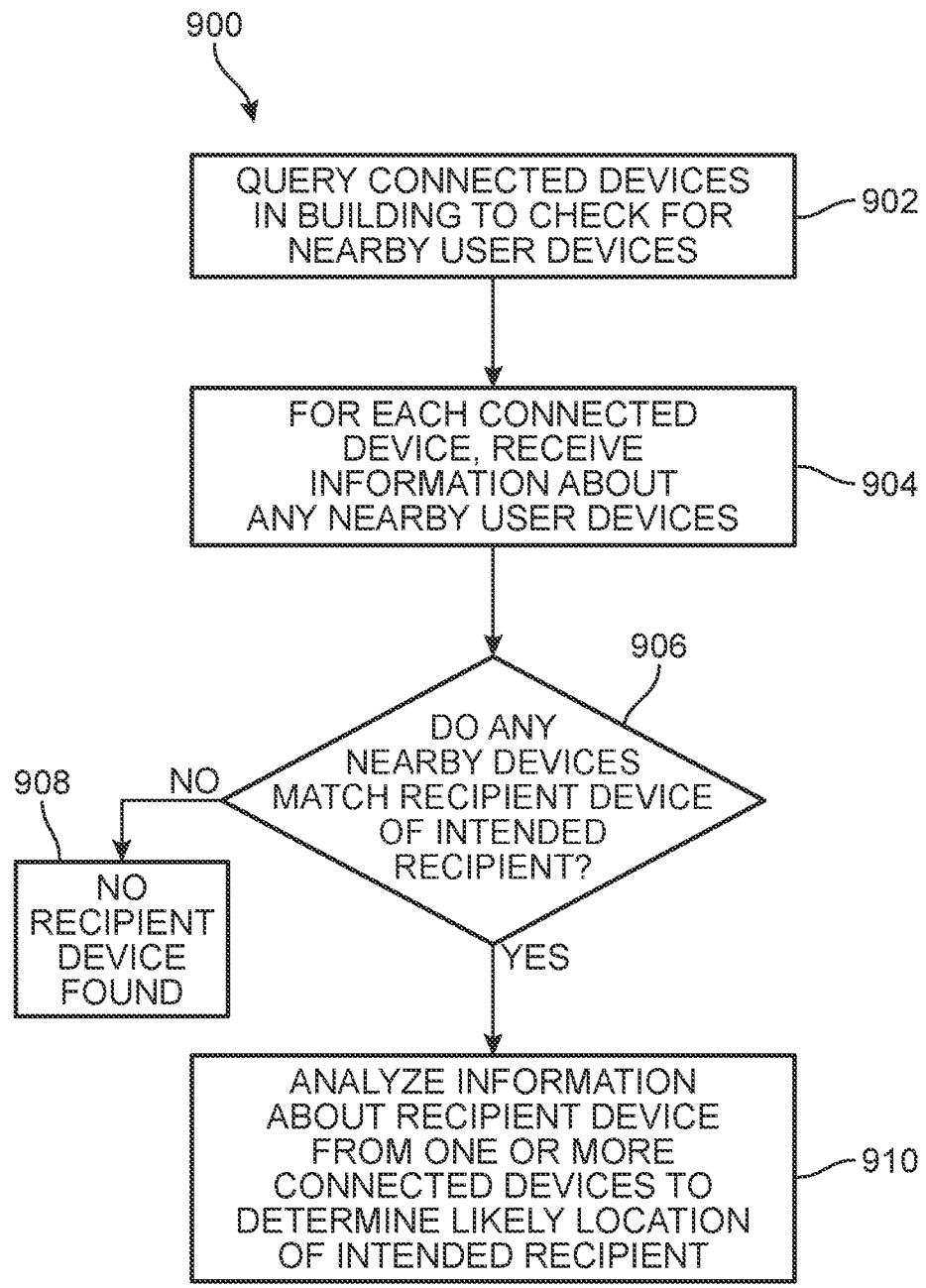
FIG. 9 is a schematic view of a process for analyzing information from one or more connected devices to locate an intended recipient, according to an embodiment.

FIG. 9 shows a process 900 for ascertaining the location of an intended recipient using information about various devices used by an intended recipient. In step 902, the smart call routing system can query connected devices within a building to check for the presence of any nearby user devices. These may be stationary or mobile devices that are known to belong to, or being frequently used by, specific users. For example, the smart call routing system could retrieve a list of user devices commonly operated, or owned, by given users in a building from user profiles 232. Mobile phones, tablets, RFID-based ID cards, and personal desktop computers may be user devices that are typically used by a single user. Therefore, these devices can often serve as a proxy for the location of an intended recipient for a call.

In step 904, the smart call routing system receives information about any nearby user devices from each connected device. For purposes of the exemplary system, a nearby device may be one that is suitably close to a connected device, such that the location of the connected device may itself be a suitable proxy for the location of the user device. In one example, a user device may be "nearby" to another connected device if the devices are located within the same room of a building. When a connected device is communicating with a user device, information such as the signal strength from the nearby device could be used to determine if the device is sufficiently nearby. Alternatively, if the connected device communicates with a user device using a sufficiently short-range network, such as a personal area network, or even shorter range networks such as near field communication networks, the connected device can presume the user device is sufficiently close so long as they are able to communicate over the sort range network. In some embodiments where devices are provided with sufficiently accurate GPS systems, the actual physical distance, as determined by GPS coordinates/positions of the connected device and a user device, could be computed and compared to a suitably determined threshold distance, such as five feet, ten feet, or twenty feet. In some cases, differential GPS techniques could be used. That is, at least one device in communication with the smart call routing system could have a fixed GPS position, which can be used to infer the GPS positions of nearby devices with higher accuracy than might be obtained using conventional GPS techniques. In still other cases, location of one or more devices could be determined using known beacons or other techniques, such as location technologies that rely on Ultra-Wideband technology.

In step 906, the smart call routing system determines if there are any nearby devices that match a known "recipient device" associated with the intended recipient of the incoming call. Here, the routing system may have access to a database of devices associated to the intended recipient, along with identifying information for those devices. This allows the connected device to pass information to the smart call routing system indicating that, for example, the connected device has determined that "Bob's iPhone is nearby to my location."

If no recipient locations are found near any of the connected devices in the building, the routing system proceeds to step 908. Otherwise, the routing system may proceed to step 910 to further analyze information for a recipient device that has been received from one or more connected devices. Because multiple connected devices with different locations may determine that a recipient device is suitably nearby, in step 910, the smart call routing system can make an assessment of the most likely location for the recipient device (and thus, for the recipient). This could be done, for example, by analyzing signal strength data for all connected devices communicating with a known recipient device. The routing system could then select the connected device receiving the strongest signal from the recipient device, and use that device's location as the intended recipient location.

It may be appreciated that some devices may continuously communicate with connected devices, even when they are not being actively used. Thus, the location of a phone that an intended call recipient has left on a counter in the kitchen may not useful in determining the intended recipient's actual location within a house. Therefore, in some embodiments, the smart call routing system can further analyze additional information about a recipient device received from one or more connected devices, and determine if the recipient device is being actively used. In some cases, for example, a smart call routing system could monitor requests from a recipient device and identify those requests that are more likely to have been actively initiated by a human user rather than a background system process. For example, the smart call routing system could look for real-time webpage requests that indicate current user activity. For mobile devices such as phones that are set to lock frequently, the routing system could request the lock status of the phone and determine the device is likely being actively used when it is unlocked. In another embodiment, the system could retrieve and analyze data from device accelerometers to infer current use based on known motion signatures for a particular user. In another embodiment, data related to device capacitance/resistance could be analyzed to infer current use based on known phone handling signatures for a particular user.

In some embodiments, a smart call routing system could analyze information about user activity on any connected devices. For example, if a connected smart speaker provides users the ability to play streaming music, the routing system could request recent streaming activity from the smart speaker to determine if the intended recipient may have recently (or is actively using) the smart speaker. By contrast with the process described above and shown in FIG. 9, the queried devices may not be associated to particular users, but may be shared devices, such as smart speakers or smart televisions. In such cases, knowing that a device is currently in use may not provide sufficient information to determine the identity of the current user.

Figure 10:
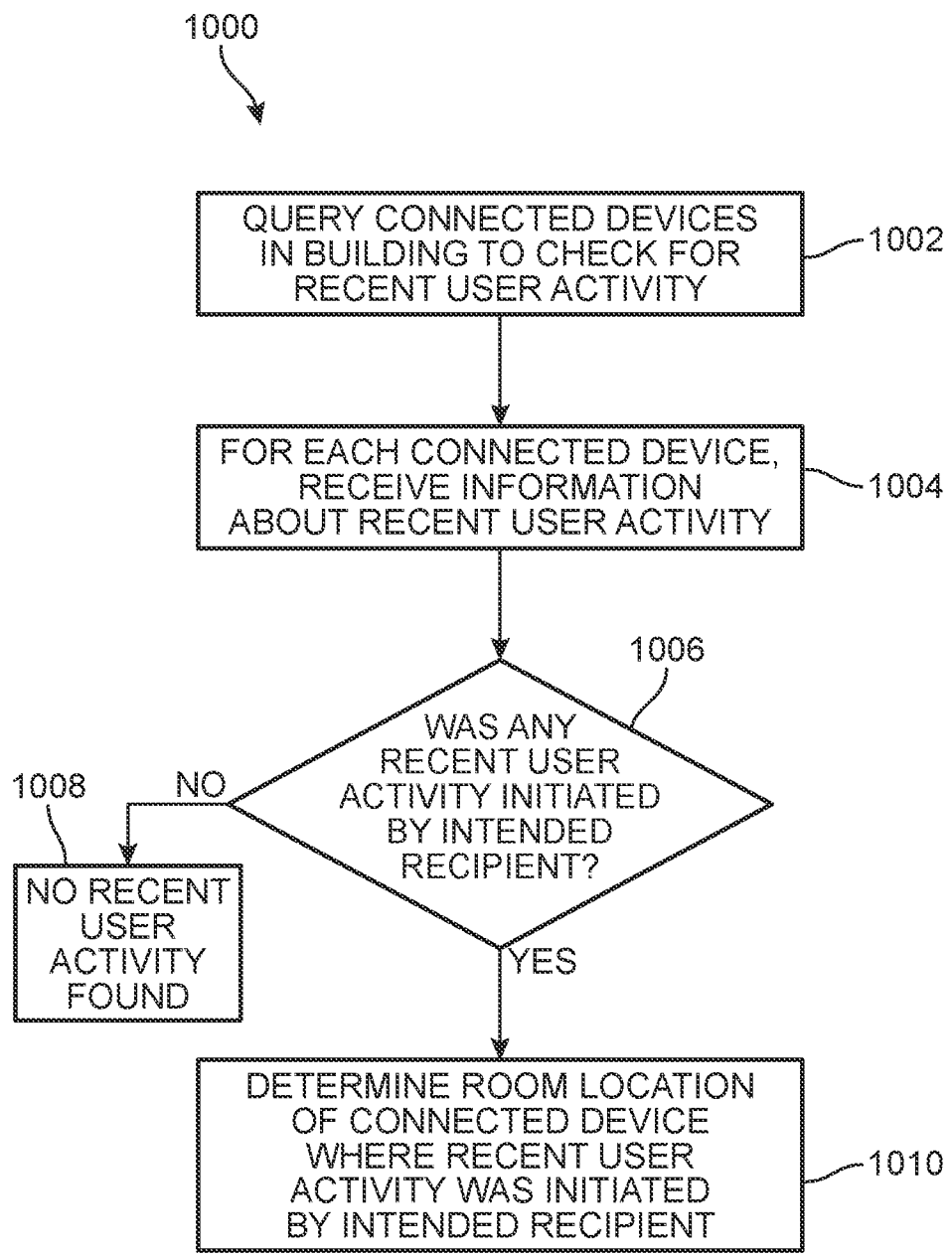
FIG. 10 is a schematic view of a process for analyzing recent user activity for one or more connected devices to locate an intended recipient, according to an embodiment.

An exemplary process for identifying the location of an intended recipient by analyzing user activity across one or more connected devices within a building is shown in process 1000 of FIG. 10. Starting in step 1002, the smart call routing system may query connected devices in the building to check for recent user activity. In step 1004, the routing system receives the recent user activity information from one or more connected devices.

In step 1006, the routing system determines if any recent user activity was initiated by the intended recipient. In some cases, the routing system could check to see if any recent user activity on any connected devices was performed using a specific user profile associated to the intended recipient. If not, the routing system proceeds to step 1008. Otherwise, the routing system proceeds to step 1010 to determine the room location (or other general location/area in a building) where the recent activity was initiated by the intended recipient.

For example, consider a scenario where an intended recipient of an incoming call is watching a streaming program on a connected television. The intended recipient may have clicked on one of several possible user profiles before watching the program, since each profile may be associated with a specific customized list of programs. Thus, the smart call routing system may query the smart television and learn that someone with the user profile associated with the intended recipient is currently watching television. At this point, the system could assign, with high probability, the location of the intended recipient as being in the same room as the television.

In some embodiments, a smart call routing system may analyze multiple channels of information simultaneously, in order to determine a location for an intended recipient of an incoming call. Here, the term channel refers to different types of data used for analysis. These can include, but are not limited to, audio/video data and user activity data. Using multiple channels may provide a more robust approach that is less dependent on errors associated with data from any particular channel.

Figure 11:
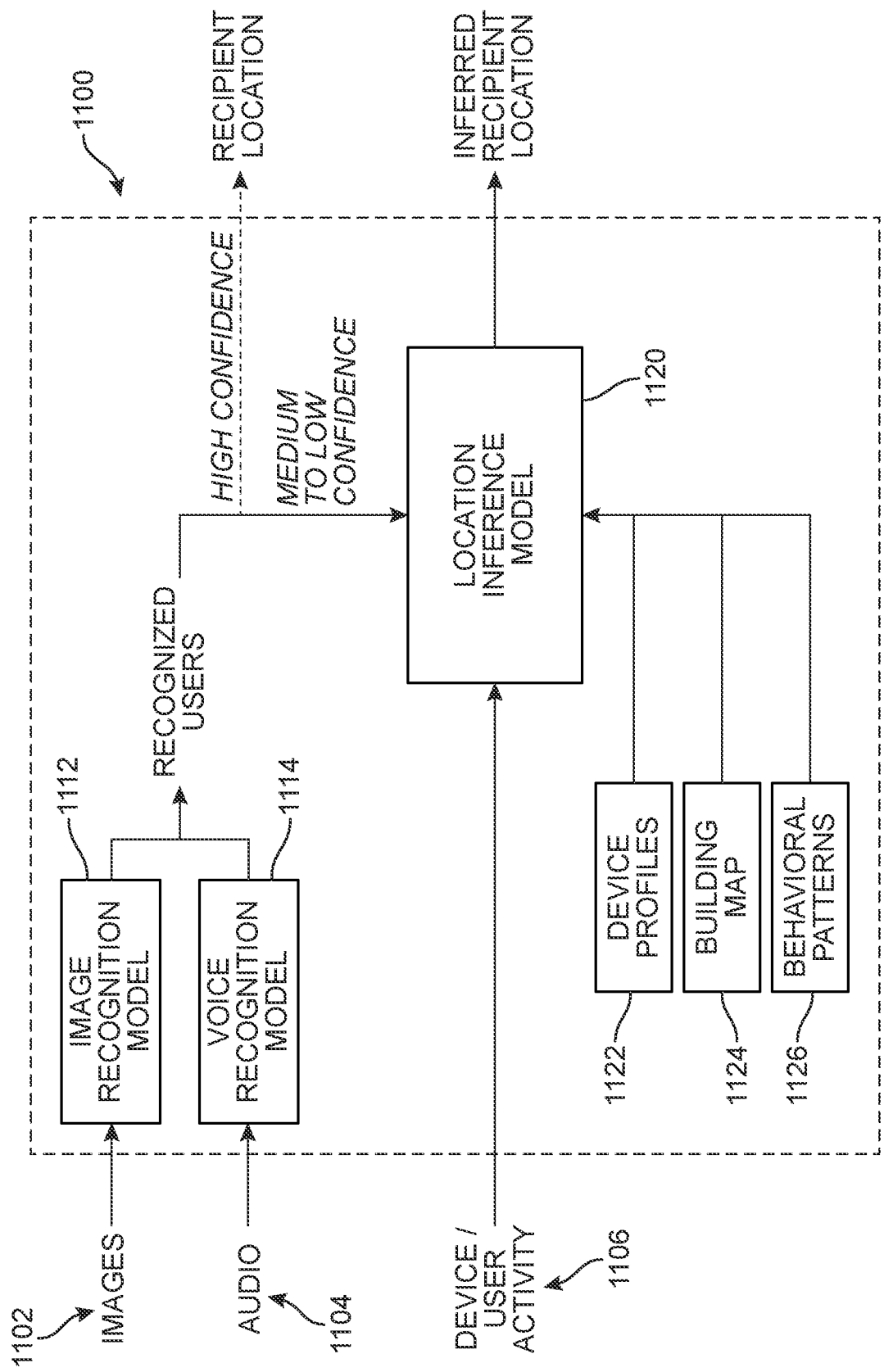
FIG. 11 is a schematic view of an architecture for a model for identifying and locating an intended recipient in a building, according to an embodiment.

FIG. 11 is a schematic view of a multi-channel architecture for a model 1100 that can determine a recipient location from various types of data. Inputs to this model could include image (or video) data 1102, audio data 1104, and device/user activity data 1106.

Because of the precision of image and voice recognition systems, model 1100 may be biased to utilize image data 1102 and audio data 1104 where it is available. By processing image data 1102 and audio data 1104 using an image recognition model 1112 and a voice recognition model 1114, respectively, users can be immediately recognized and their locations inferred as described previously.

However, in many situations, suitable image and/or audio data may not be available. For example, a building may not have any connected video devices. Or images of users may not capture the user's face to enable identification via image recognition. In these cases, model 1100 can utilize device and/or user activity to infer intended user locations, as described above. In this case, device/user activity data 1106 is fed into a location inference model 1120. Location inference model 1120 may also receive classifications of users from image and/or voice recognition models.

Location inference model 1120 may also utilize additional information to help infer an intended recipient's location. This additional information may comprise device profiles 1122, a building map 1124, and behavioral patterns 1126. For example, device profiles 1122 may be used to identify devices as belonging to, or being frequently used by, specific users. Building map 1124 may be used to assign locations to a user device based on known locations of connected devices, as well as the sizes, shapes, and locations of rooms and other predetermined areas within a building. Behavioral patterns 1126 could include historical patterns of device usage, which may be useful in determining if a particular device is likely being actively used by an intended recipient. As an example, behavioral patterns 1126 could include information indicating that a particular known user operates a given user device (such as a desktop computer or tablet) every weekday morning. Thus, if an incoming call for the particular known user is received on a weekday morning, the routing system may assume the user device's location is a reasonable proxy for that particular known user's location. As another example, ingest logs from video-conference or collaboration tools could be analyzed to determine if IP ranges are associated with remote access (VPN) etc. or dial-in out-of-band, to help determine if the user is likely to be physically located in the building.

The embodiments may include provisions to avoid utilizing complicated inference models when sufficiently accurate image and/or audio data are available from one or more connected devices.

Figure 12:
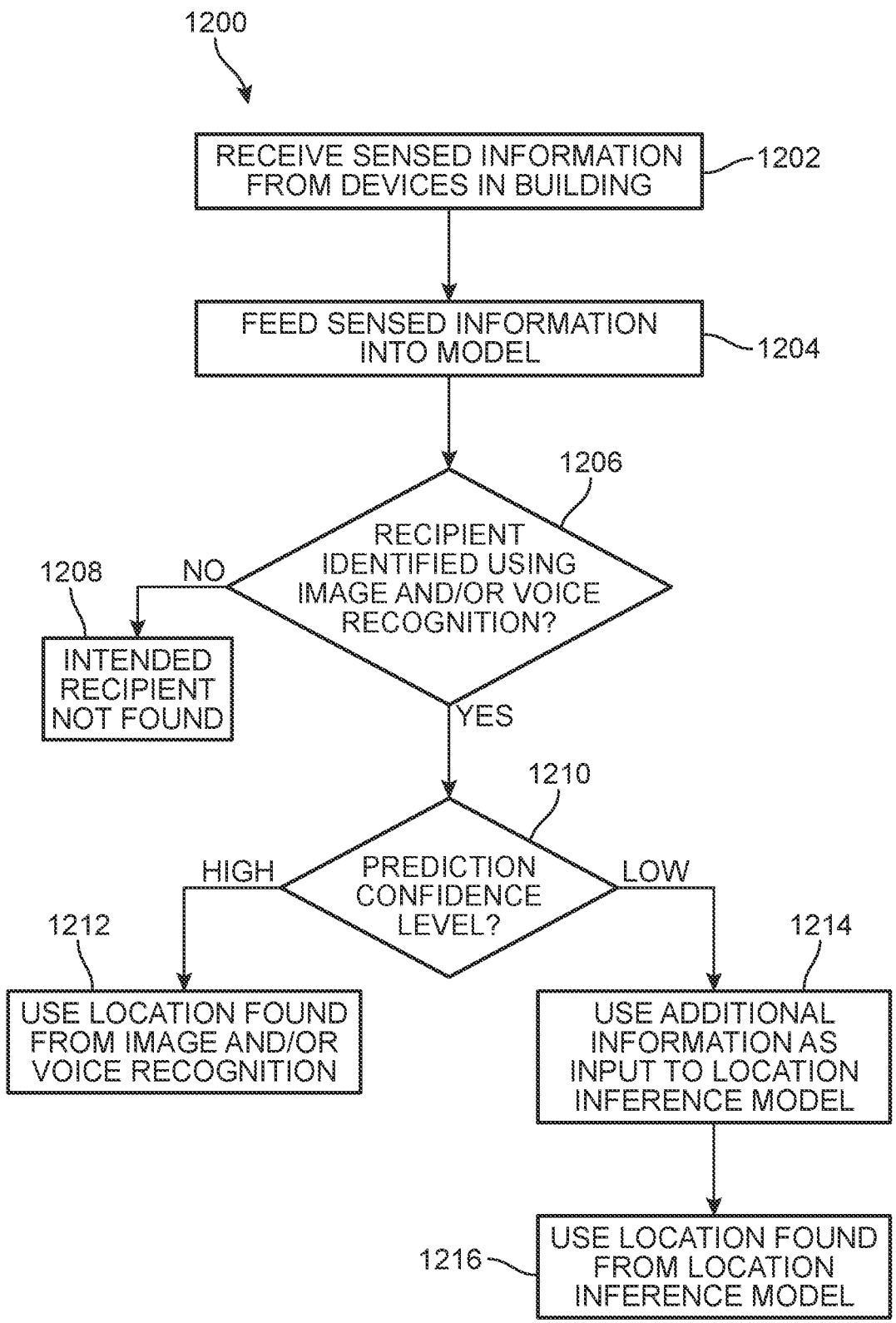
FIG. 12 is a schematic view of a process for identifying and locating an intended recipient in a building, according to an embodiment.

FIG. 12 is a schematic view of a process 1200 for determining a location according to the confidence level of a prediction from an image or voice recognition model. As already discussed, image and/or voice recognition can be highly accurate methods for identifying a particular person. Therefore, when the prediction level of these machine learning systems is high due to use of high quality images and/or audio, the smart call routing system may be biased to use this analysis to infer the location of an intended call recipient. In particular, when an intended recipient is identified using image and/or voice analysis with high confidence, the routing system may choose to ignore any additional data, which can overcomplicate the analysis. However, if the confidence level of predictions based on image and/or voice analysis are low, for example because of low quality or partial input data, the smart call routing system may use additional information to help infer a location.

In step 1202, the routing system receives sensed information from one or more devices in a building. This may include audio and/or video data. In step 1204, the routing system feeds the sensed information into one or more models, including image and/or voice recognition models. In step 1206, the routing system determines if the intended recipient has been identified using the one or more models. If not, the routing system proceeds to step 1208, otherwise the routing system proceeds to step 1210.

In step 1210, the routing system determines if the prediction confidence level is high or low. In particular, the routing system may utilize machine learning models that provide confidence intervals or other information indicating the quality of a particular prediction for a recognized recipient. In some cases, for example, a neural network could output numbers for each possible identified user. The value of the number, typically between 0 and 1, may serve as a measure of confidence in the prediction. Thus, the higher the number, the higher the system's confidence in a particular prediction. In some cases, to distinguish between high and medium or low confidence levels, a system could use a threshold value, such as 0.5 or 0.75. The value of the threshold could be determined as a meta-parameter of the model.

For high confidence predictions, the routing system can assign the recipient location using only the image/audio analysis, as described above, in step 1212. In particular, as shown in FIG. 11, for high confidence predictions the more robust (but complex) location inference model 1120 can be bypassed and the recipient location determined more directly. Namely, for high confidence predictions, the system assumes the recipient has been recognized from images and/or audio with high confidence, and determining the recipient location is simply a matter of identifying the device(s) where the image/audio data was gathered.

For medium to low confidence predictions, the routing system may use additional information (such as device activity and/or user activity information) as input to a location inference model (such as model 1120 of FIG. 11), in step 1214. The location may then be that assigned by the location inference model using the full location inference model 1120, as in step 1216. The full location inference model may consider not only real-time data, such as images, audio and/or device/user activity, but also various behavioral patterns, such as historical patterns of user locations. As a simplified example, suppose that image and voice recognition do not provide high confidence predictions of the intended recipient after analyzing images/audio from connected devices in the building. Then, the routing system can leverage information about devices, device/user activity, building maps, and/or user behavior patterns to make a predictions about the recipient's location. For example, the system could detect activity of from a known device of the intended recipient in a particular area of the building, and further confirm that the intended recipient is frequently located in the particular area, based on historical data. This allows the system to predict an inferred recipient location for routing the incoming call.

Using the exemplary approach, the smart call routing system can avoid using complex models, which may be subject to more modeling errors that image and/or voice recognition models, anytime there is high quality image/audio data available. This simplifies the prediction process, reduces computational overhead, and improves overall accuracy of the system.

Some embodiments could make use of ingress/egress information in evaluating where to route call. In some cases, cameras positioned at doors of a building could be used to monitor ingress and egress. Using computer vision algorithms, including any of the neural networks described above, video could be analyzed to identify an intended recipient and determine that they may be entering or exiting a building, structure, or otherwise entering or exiting a premises. In other embodiments, egress sensors, comprising motion-based sensors, could be used to monitor ingress and/or egress from a building or premises.

In the exemplary embodiments described above, the smart routing system attempts to locate an intended recipient of an incoming call in real-time. That is, identifying and locating the intended recipient is done after the incoming call has arrived at the routing system. However, it may be appreciated that in other embodiments, identification and location of various users can be done prior to receiving incoming calls. That is, a routing system could continuously track real-time locations of different users via the methods described above. When an incoming call arrives, the routing system could determine the intended recipient and immediately retrieve the location of the recipient from memory, since the locations of all users in the building are constantly tracked and updated.

It may be appreciated that locating a recipient based on various kinds of data, including sensed data or information related to device/user activity, could incorporate time-out features. In some embodiments, assigning a location based on recent user activity may only be done when the user activity occurred within a predetermined period from the time when the system checks. For example, using a predetermined period of 15 minutes, the system may only assign a location to a user based on user activity when the activity occurred within the last fifteen minutes. Likewise, the system may only use various kinds of sensed information (for example, from cameras) to infer a user's location when the information was sensed within the predetermined period (e.g., 15 minutes). If the system finds recent user activity across different devices (or senses the location of a user from different sensory device inputs), the system could assign the location based on the system/device where a user (or user activity) was most recently sensed/detected. Any of these provisions may be incorporated into any of the methods described above for determining an intended caller's location based on recent user activity, device activity, or sensed information.

Moreover, as a failsafe, some methods could default to routing an incoming call to multiple, or even all, calling devices on a premises. Specifically, if the system cannot locate the intended recipient of a call through direct sensing (for example, using cameras or microphones) or through detecting recent device/user activity, the system may route the incoming call to all devices on the premises. In some cases, where multiple calling devices are located in the same room/area, the system could route the incoming call to one calling device for each different designated area (e.g., room) of the premises.

The processes and methods of the embodiments described in this detailed description and shown in the figures can be implemented using any kind of computing system having one or more central processing units (CPUs) and/or graphics processing units (GPUs) or transaction processing units (TPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, and edge processing machine learning devices, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method, comprising:
   receiving, at a call routing system running on a computing device, an incoming call;
   determining, at the call routing system, an intended recipient for the incoming call;
   receiving first sensed information captured by sensors of a first device located in a first area of a premises and receiving second sensed information captured by sensors of a second device located in a second area of the premises, wherein the first area and the second area are different;
   using machine learning to process the first sensed information and the second sensed information and determining that the intended recipient is located in one of the first area of the premises or the second area of the premises based on processing the first sensed information and the second sensed information;
   selectively routing the incoming call to a first call receiving device in the first area when the intended recipient is determined to be located in the first area of the premises; and
   selectively routing the call to a second call receiving device in the second area when the intended recipient is determined to be located in the second area of the premises.

2. The method according to claim 1, wherein determining the intended recipient for the incoming call includes receiving recipient information as part of the incoming call.

3. The method according to claim 1, wherein determining the intended recipient for the incoming call includes receiving caller information as part of the incoming call, and inferring the intended recipient from the received caller information.

4. The method according to claim 3, wherein inferring the intended recipient further comprises using a table relating callers to recipients.

5. The method according to claim 1, wherein the first sensed information comprises a first set of images, wherein the second sensed information comprises a second set of images, and wherein using machine learning further includes using a neural network to process the first set of images and to process the second set of images.

6. The method according to claim 1, wherein the first sensed information comprises a first audio sample, wherein the second sensed information comprises a second audio sample, and wherein using machine learning further includes applying natural language processing to the first audio sample and to process the second audio sample.

7. The method according to claim 1, wherein the method further comprises:
   querying the first device and the second device to determine if any devices associated with the intended recipient are communicating with the first device or the second device; and
   wherein selectively routing the incoming call includes analyzing any communication between the first device and the second device and any user devices.

8. The method according to claim 1, wherein the method further comprises:
   querying the first device and the second device to determine if there has been any recent user activity associated with the intended recipient; and
   wherein selectively routing the incoming call includes analyzing any recent user activity.

9. A method, comprising:
   receiving, at a call routing system running on a computing device, an incoming call;
   determining, at the call routing system, an intended recipient for the incoming call;
   retrieving a list of user devices associated with the intended recipient;
   querying a first device located in a first area and a second device located in a second area to check for any devices from the list of user devices that are in communication with the first device or with the second device;
   receiving, in response to querying the first device and the second device, information about one or more user devices in the list of user devices that are in communication with the first device or with the second device;
   determining that at least one user device in the list of user devices is located near the first device or near the second device based on information about one or more user devices in the list of user devices that are in communication with the first device or with the second device; and
   upon determining that the at least one user device is located in the first area or the second area, the method further includes selectively routing the call to a first call receiving device in the first area when the at least one user device is determined to be near the first device, and selectively routing the call to a second call receiving device in the second area when the at least one user device is determined to be near the second device.

10. The method according to claim 9, wherein determining the intended recipient for the incoming call includes receiving recipient information as part of the incoming call.

11. The method according to claim 9, wherein determining the intended recipient for the incoming call includes receiving caller information as part of the incoming call, and inferring the intended recipient from the received caller information.

12. The method according to claim 9, wherein determining that at least one user device in the list of user devices is located near the first device or the second device includes receiving information about a lock status of the at least one user device.

13. The method according to claim 9, wherein determining that the at least one user device is located near the first device or near the second includes analyzing a first signal strength between the at least one user device and the first device and a second signal strength between the at least one user device and the second device.

14. The method according to claim 9, wherein determining that the at least one user device is located near the first device or near the second device includes comparing a position of the at least one user device with positions of the first device and of the second device.

15. The method according to claim 9, wherein the first call receiving device and the first device are the same device.

16. A method, comprising:
- receiving, at a call routing system running on a computing device, an incoming call;
- determining, at the call routing system, an intended recipient for the incoming call;
- querying a first device located in a first area and a second device located in a second area to check for recent user activity on the first device and on the second device;
- receiving information about recent user activity from on the first device and from the second device;
- determining that the recent user activity was performed by the intended recipient;
- determining that the intended recipient is located in the first area or the second area based on the recent user activity on the first device and on the second device; and
- upon determining that the intended recipient is located in the first area or the second area the method further includes selectively routing the call to a first call receiving device in the first area when the intended recipient is determined to be in the first area and selectively routing the call to a second call receiving device in the second area when the intended recipient is determined to be in the second area.

17. The method according to claim 16, wherein receiving information about the recent user activity includes receiving information indicating that a user recently streamed music on the first device.

18. The method according to claim 16, wherein determining the intended recipient for the incoming call includes receiving caller information as part of the incoming call, and inferring the intended recipient from the received caller information.

19. The method according to claim 16, wherein inferring the intended recipient further comprises using a table relating callers to recipients.

20. The method according to claim 16, wherein the first call receiving device and the first device are the same device.

* * * * *